Feb. 23, 1926.
E. E. BROWN
SAFETY CONNECTION FOR POWER TRANSMISSION
Filed April 18, 1925
1,574,466
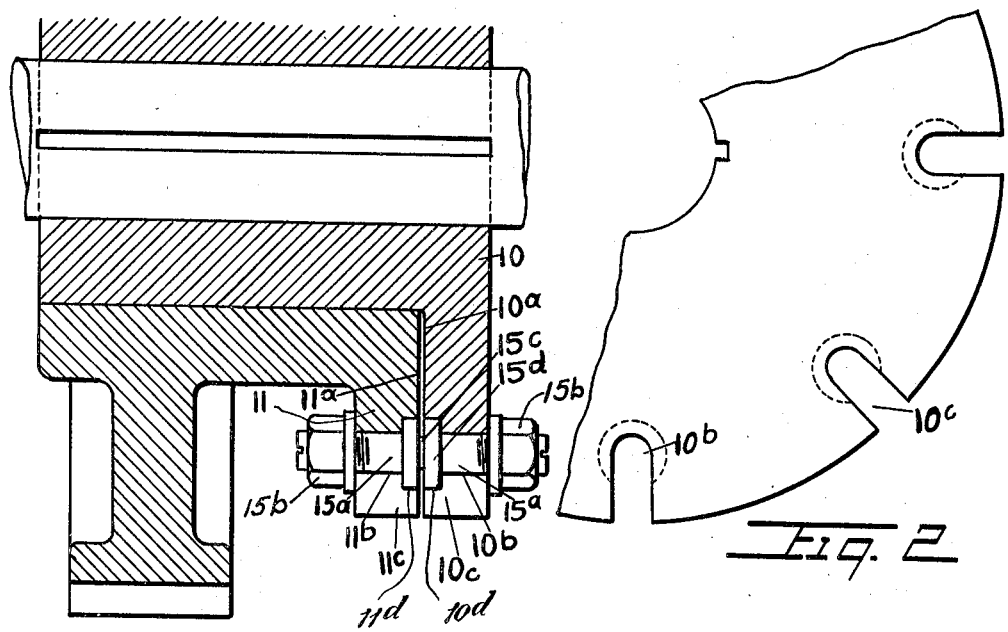
Fig. 1
Fig. 2
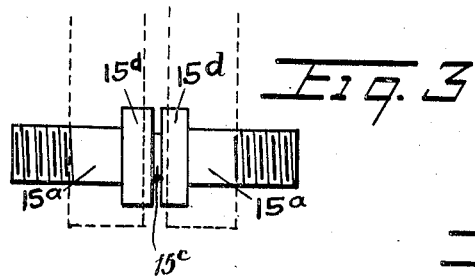
Fig. 3
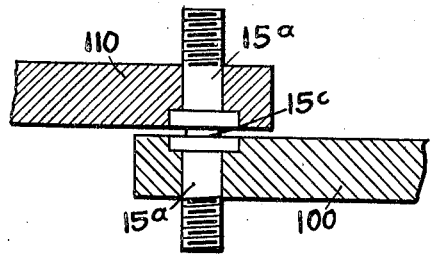
Fig. 5
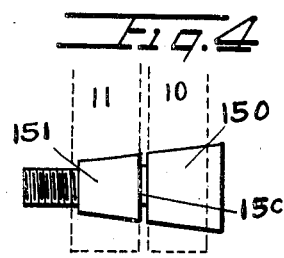
Fig. 4
Ellis E. Brown  INVENTOR.
BY  ATTORNEYS Patented Feb. 23, 1926.

1,574,466

UNITED STATES PATENT OFFICE.

ELLIS EUGENE BROWN, OF SPRINGMONT, PENNSYLVANIA.

SAFETY CONNECTION FOR POWER TRANSMISSION.

Application filed April 18, 1925. Serial No. 24,299.

*To all whom it may concern:*

Be it known that I, ELLIS E. BROWN, a citizen of the United States, residing at Springmont, in the county of Berks and State of Pennsylvania, have invented certain new and useful Improvements in Safety Connections for Power Transmission, of which the following is a specification.

My invention relates to power-transmitting mechanisms which comprise safety connection between the driving and driven members intended to prevent breakage of main parts of the mechanism by excessive transmission strains to which they are otherwise liable.

Shear-bolt connections for such members have heretofore been employed with the general purpose in view of adapting them to yield to transmission strains in excess of the normal but within the resistive strength of main parts of the mechanism. The recognized fact is however, that such connections have not heretofore provided for insuring that the shear-bolt shall be subjected to the full power-transmission strain, and that such strain should be effectively measured thereby so as to provide for reliably transmitting power up to a determined maximum but not in excess thereof. In order that this may be accomplished I have found it to be essential particularly: first that frictional resistance to relative movement of the connected members be eliminated; and second, that the resistive strength of the shear-bolt connection shall be reliably measured by the determined shearing strength of a definite part thereof without regard to other strains imparted by the transmitting force. My invention provides for meeting these essential requirements in a simple and otherwise advantageous construction which is fully described in connection with the accompanying drawings illustrating embodiments thereof and the novel features of which are clearly defined in the subjoined claims.

Fig. 1 is a sectional view illustrating the adaptation of my invention to a rotary shaft coupling; Fig. 2 being an end view of the fragmentary showing of the latter.

Fig. 3 is a separate view of the shear-bolt shown in Fig. 1; connected members being indicated in dotted lines.

Fig. 4 illustrates a modified form of shear-bolt embodying the main features of my invention; connected members being indicated in dotted lines.

Fig. 5 indicates the applicability of my invention to non-rotary transmissions.

Reference characters 10 and 11 indicate parallel circular flanges of the driving and driven members respectively of a rotary power-transmission mechanism; which flanges are operatively connected by my improved shear-bolt. The opposed faces $10^a$ and $11^a$ of these flanges are shown as clearly separated so as to obviously eliminate any frictional contact between them such as would prevent free relative movement, excepting for the shear-bolt connection; the elimination of friction such as is ordinarily produced by pressure-contact of the connected members being an essential object of my invention as previously stated. The flanges 10 and 11 are provided with alined bolt holes $10^b$ and $11^b$ respectively; and, as shown, these holes are preferably provided with radial slot-ways $10^c$, $11^c$ thereto, particularly to enable lateral removal of the severed parts in case the shear-bolt is severed by excessive transmission strain, as hereinafter described.

My improved shear-bolt is characterized essentially; first by the provision of oppositely extending body portions $15^a$, $15^a$, adapted respectively to be rigidly engaged in the holes $10^b$ and $11^b$ of the connected members so as to positively prevent pressure-contact of the opposed faces $10^a$ and $11^a$ of the latter when such rigid engagement is effected—as by end nuts $15^b$, $15^b$ upon the projecting body portions $15^a$, $15^a$; and second, the provision of a uniting shearing portion $15^c$ between the body portions $15^a$, $15^a$ of the bolt,—which shearing portion $15^c$ is made of short axial extent so as to practically eliminate bending action thereof—(as by grooving with a thin saw or cutting tool); and of a reduced cross-sectional area determined by the shearing strength required to withstand only the maximum force of transmission desired; the shearing area and strength of such reduced uniting portion $15^c$ of the bolt being sufficiently less than the crushing area and strength of the member—engaged body portions $15^a$, $15^a$ to insure that the shearing action will reliably occur at the determined maximum force of transmission.

As shown in Figs. 1 and 2 the oppositely extending body portions $15^a$, $15^a$ of the bolt are formed with intermediate adjacent heads $15^d$, $15^d$ separated by said reduced uniting portion 15ᶜ; said heads being seated respectively in correspondingly counterbored portions 10ᵈ, 11ᵈ of the holes 10ᵇ, 11ᵇ of the connected members so as to determinedly prevent pressure-contact of the opposed faces 10ᵃ, 11ᵃ of the latter, and to also provide ample fibre-crushing resistance in the connection and insure full shearing action of the transmitted force upon the determinedly-resistive shearing portion 15ᶜ of the bolt. Thus the readily fixed shearing strength of said reduced portion 15ᶜ reliably measures the maximum power determined upon as safely transmissible, without permitting undeterminable variation such as has been heretofore caused by incidental frictional resistance and by uncertain disruptive effect upon the safety connection. It will be readily seen that if my improved safety bolt as shown, is severed by being subjected to excessive transmission strain, the severed parts will be safely retained in the then independently rotatable members; and further that said partes may be conveniently removed separately through the radial slotways 10ᵉ provided.

In the modified form of my improved shear-bolt shown in Fig. 4, the definitely formed heads 15ᵈ, 15ᵈ are dispensed with; the tapered body portions 150, 151 of the bolt however being rigidly seated in the correspondingly tapered holes of the connected members when the latter are held in determined non-contacting relation, and the reduced uniting portion 15ᶜ being adapted to reliably transmit only the maximum permissible force of transmission as in the preferred construction. In Fig. 4 I have indicated the applicability of my invention to non-rotary connected members 100, 110; the power transmitted being in like manner measured closely by the strength of the very short and reduced uniting portion 15ᶜ of the bolt without pressure-contact friction of the connected members. It will be understood that the important object of my invention is the providing of a safety connection adapted to transmit a determined maximum only of power as reliably imparted to and measured by a fixed shearing resistance provided, as defined in the claims.

What I claim is:—

1. A safety power-transmitting connection for driving and driven members, comprising a double-bodied member-connecting shear bolt the oppositely extending body portions of which are immovably positioned in the respective members so as to positively fix the latter in determined adjacent relation and the uniting shear portion of which is of a reduced cross-section having a shearing strength adapted to withstand only a determined maximum force of transmission.

2. A safety power-transmitting connection for driving and driven members, comprising a double-bodied shear bolt the oppositely extending body portions of which are rigidly engaged in the respective members so as to positively prevent the latter from being moved into frictional contact with each other and the uniting shear portion of which is of a reduced cross-section and subjected to the full force of transmission.

3. A safety power-transmitting connection for driving and driven members, comprising a double-bodied shear bolt the oppositely extending body portions of which are rigidly engaged in the respective members and the uniting shear portion of which is of a reduced cross-section having a shearing strength adapted to withstand only a determined maximum force of transmission; said bolt being adapted to connect the members so as to positively prevent friction-producing pressure-contact thereof, and said reduced cross-section thereof being shortened axially to eliminate bending effect thereon.

4. A double-bodied connecting shear-bolt for driving and driven members having intermediately located head portions united by a short shear-portion of reduced cross-section.

5. A power transmission mechanism comprising rotary driving and driven members having opposedly arranged circular flanges provided with alined connecting-bolt holes; and connecting bolts having oppositely extending body portions engaged in the respective flange holes, and spaced-apart heads seating against the opposed faces of the flanges; the uniting bolt portion between the heads being of short axial extent and reduced cross-sectional area to provide a determined shearing resistance to the force of transmission.

6. A power transmission mechanism comprising rotary driving and driven members having opposedly arranged circular flanges provided with alined connecting-bolt holes having radial slot-ways thereto; and connecting bolts having oppositely extending body portions engaged in the respective flange holes, and spaced-apart heads seating against the opposed faces of the flanges; the uniting bolt portion between the heads being of short axial extent and reduced cross-sectional area to provide a determined shearing resistance to the force of transmission.

7. A safety power-transmitting connection for driving and driven members comprising a double-bodied connecting bolt having an intermediate shear portion of reduced cross-section and oppositely extending body portions which are immovably positioned in the respective members.

In testimony whereof I affix my signature.

ELLIS EUGENE BROWN,